Patented May 18, 1943

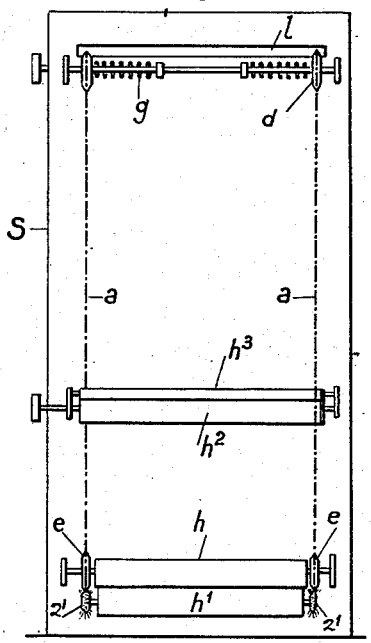
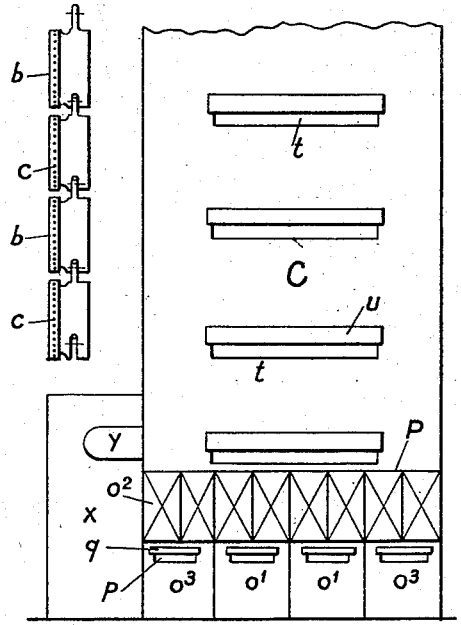
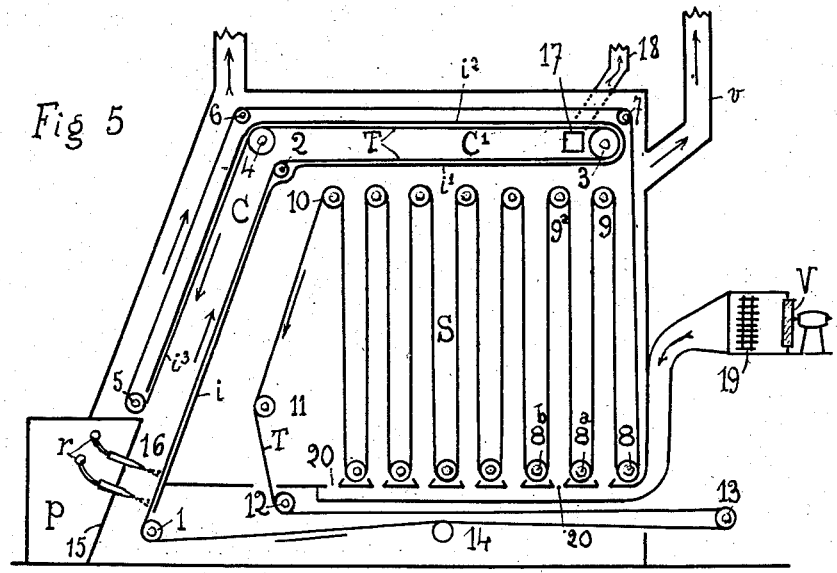

2,319,353

UNITED STATES PATENT OFFICE 2,319,353

COATING OF SURFACES WITH LIQUIDS BY SPRAYING

Fernand Frederic Schwartz and Marc Alfred Chavannes, Paris, France, assignors, by mesne assignments, to Ecla Patents Corporation, New York, N. Y., a corporation of New York Application June 21, 1938, Serial No. 214,916
In France July 2, 1937

6 Claims. (Cl. 117—106)

This invention is for improvements in or relating to the spraying of liquids and has particular reference to the treatment of fabric or other surfaces which can be moved past the spraying device. Such a process is described in United States patent specification Serial No. 162,892. In that specification a process is described in which a fabric is sprayed with rubber latex and is immediately passed to a drying chamber and is thereafter returned after drying to the spraying chamber.

It has been found that there may with advantage be combined with a spraying chamber a chamber or enclosed space along which any particles of liquid not deposited immediately on the surface being sprayed are carried by means of a current of gas, e. g. air in contact with the sprayed surface.

It is an object of the present invention to render the process of treating surfaces with liquids and in particular fabrics with latex, e. g. rubber latex more economical and effective by minimising losses of liquid during spraying.

It has been found that this result may be achieved by maintaining the surface after spraying in contact with a current of gas, e. g. air introduced into the spraying chamber independently of the spraying device in order that globules of liquid suspended in the air in the spraying chamber may have an opportunity of depositing from the air on to the surface.

The present invention accordingly comprises a method of coating a surface with liquid which consists in spraying the liquid on the said surface and thereafter moving the sprayed surface in an enclosed space in contact with the gaseous suspension formed of droplets of the spraying liquid which are not deposited on the said surface during spraying, the said suspension being carried along the enclosed space by means of a current of a gas introduced independently of the spraying device.

The liquid to be sprayed may consist of rubber latex and it may be applied to the surface of a fabric.

Apparatus for carrying out the spraying process may include means for spraying a surface with liquid, a conduit through which said surface is passed after leaving the spraying means and means for passing a gas such as air introduced independently of the spraying device along said conduit in the direction of motion of the surface so as to maintain the said surface in contact with the mist of the sprayed liquid which is not deposited during the spraying operation itself. The conduit may be provided along its length with air inlets and with baffles for directing the current of mist-laden air into contact with the sprayed surface passing through the conduit.

The chamber containing the spraying means may be provided with an air inlet so arranged that droplets of the liquid which are not deposited on the surface of the fabric during spraying are prevented by the incoming air from being deposited on the walls or floor of the spraying chamber itself.

The conduit may be inclined to the horizontal and the surface to be sprayed may be moved along the lower part of the conduit in order that globules of liquid may be deposited upon the surface by gravity as the surface passed through the conduit.

Apparatus for coating a flexible material such as a fabric in accordance with the present invention may consist of a spraying chamber, a conduit adjacent to the spraying chamber, a drying chamber and an endless conveyor arranged to support the material to be coated and to circulate continuously through the spraying chamber, the said conduit and the said drying chamber in turn.

In an alternative method of carrying the invention into effect, a flexible surface, e. g. of fabric, is supported on a conveyor passing round pulleys so arranged that the fabric itself constitutes at least the major part of a pair of opposite walls of the conduit in which deposition of the suspended globules of liquid takes place. Thus, the conveyor with its fabric attached may be bent back on itself so that the surfaces of the fabric face each other, one surface (namely that leaving the spraying device) moving in one direction and the other surface moving in the opposite direction.

The length of the conduit formed by the fabric may be increased without unduly increasing the size of the whole apparatus by causing the conveyor to follow first a path inclined to the vertical and then a horizontal path, the conveyor bending back on itself both in its inclined and horizontal paths.

Apparatus for carrying out the method above-described includes an endless conveyor to which the surface, e. g. a fabric surface, to be coated by spraying is secured, spraying means, e. g. a spray gun or spraying guns and a drying chamber, the conveyor bending back on itself after leaving the spraying means so that the fabric constitutes the major part of the walls of a conduit receiving the mist-laden air from the spray guns and subsequently passing through the drying chamber and thence back to the spray guns. The rate of travel of the conveyor is such that one coating of liquid is dried before a second coating of liquid is applied.

Following is a description by way of example only and with reference to the accompanying drawings of two methods of carrying the invention into effect in the application of rubber latex in the form of a spray to the surface of a fabric.

In the drawings:

Figure 2 is a front elevation of the spraying chamber and its conduit;

Figure 3 is an end view of the apparatus at the end opposite to the spraying chamber;

Figure 4 is a detailed view on a larger scale of a portion of one of the chains, and Figure 5 is a sectional side elevation of an alternative form of apparatus.

Similar references denote similar parts throughout the figures of the drawings.

Figure 1:
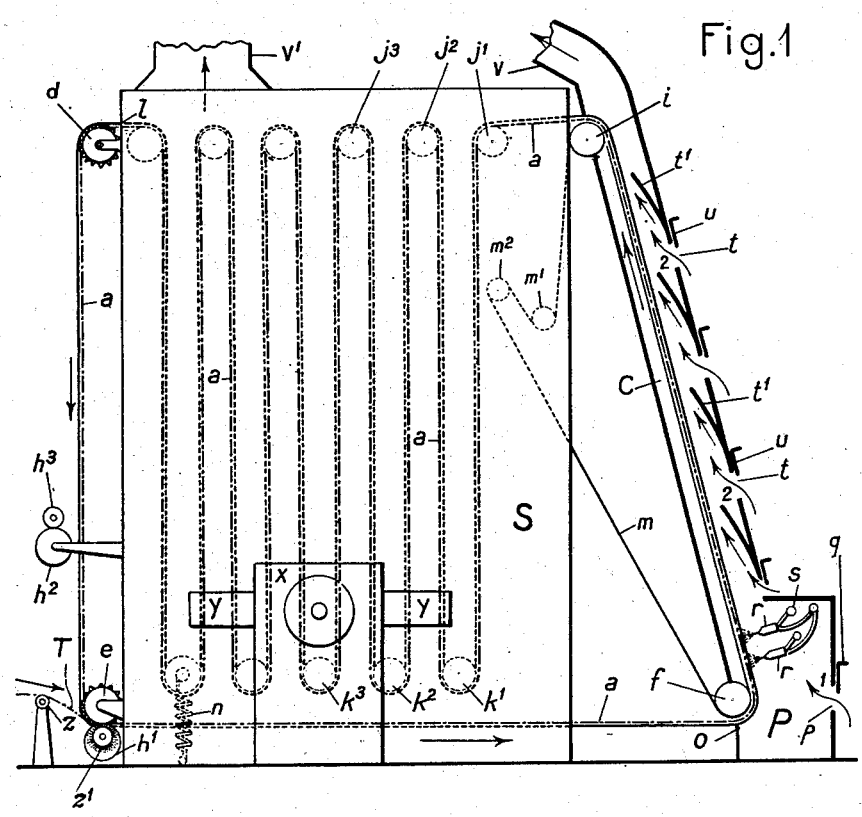
Figure 1 is a side elevation of one form of spraying apparatus, the spraying chamber and the conduit being shown in section.

The apparatus comprises a spraying chamber P, a tunnel or conduit C constituting a precipitation chamber and a drier S.

The fabric to be sprayed is fixed on a conveyor constitued by two parallel endless chains $a$, Figure 3, in which each link carries a small plate $b$, (Figure 4) provided with needle points $c$ which are engaged in the edges of the fabric in a manner known in other processes for the treatment of fabrics.

Pinions $d$, $e$, and $f$ (teeth not shown) support and drive the chains and retain the fabric at its correct width, these pinions being arranged so as to slide longitudinally on their spindles and the two pinions of each pair being continuously kept apart by springs such as $g$, Figure 3, so as to maintain the fabric at its full width.

As shown in Figure 1 chains $a$ pass from the pinions $f$ to driving pinions $i$ after passing through the spraying chamber P and the precipitation tunnel C; they then enter the drier S where they pass round a series of return pinions, $j^1$, $j^2$, $j^3$ ... $k^1$, $k^2$, $k^3$ (Figure 1). The chains then pass through an aperture $l$ (Figure 3) and pass to the outside of the apparatus, around supporting pinions $d$ and $e$ and thence to the pinions $f$.

Referring to Figure 1, certain of the spindles carrying the pinions in the drier may be mounted so as to apply tension to the chains by the action, for example, of weights or springs such as $n$.

In passing through the spraying chamber the fabric is supported on an endless felt support $m$ which passes over rollers concentric with the pinions $f$ and $i$ and over reversing rollers $m^1$ and $m^2$. This supporting felt is driven at the same speed as the chains.

The spraying chamber is provided with a narrow aperture $o$ for the entry of the fabric and with doors $o^1$ and windows $o^2$ for observing the spraying operation. Air inlet openings $p$ are made in the doors and in the fixed panels $o^3$ and are provided with regulating means, for example, in the form of flaps $q$ for the introduction, e. g. by means of a fan, of a current of air independently of the spraying device. The spray-guns $r$ are mounted on rods $s$ and are so arranged that they can be adjusted from the outside of the chamber and may be given either a longitudinal or rotary movement.

The conduit C is provided with a series of openings $t$ with regulating throttles $u$. Baffles $t^1$ deflect the currents of air entering the conduit against the fabric. The upper extremity of the conduit is connected to a suction pipe $v$ passing into the open air.

Hot air for the drying step of the process is delivered by a fan mounted in a box $x$, Figure 2, which passes air through steam radiators and thence through conduits $y$ into the drier. The air leaving the drying chamber is passed to a conduit $v^1$.

In treating a web of fabric T this is laid on a tentering cylinder $z$ and one end of the fabric is placed between a cylinder $h$ (Figure 3) concentric with the pinions $e$ and another cylinder $h^1$ pressed against the first. Care is taken to place the edges of the fabric on the needle points of the links which are under the pinions $e$, the chains being moved at a moderate speed during this operation and the fabric being drawn along with the chains. Its edges are pressed against the needle points of the links by brushes $z^1$ and the fabric thus comes into the machine stretched over the whole development of the chain.

The web of fabric treated may conveniently be of the same length as the chain, the ends of the web being temporarily connected together by clips or by sewing. If desired, webs of fabric of smaller length than the chain may be treated. In applying a spray of rubber latex to the fabric, the fabric circulates in a continuous manner in the closed circuit and receives a thin coating of atomised latex. Each coating is dried before the application of a subsequent coating and the number of coatings may be increased in accordance with the thickness of rubber required.

When the necessary thickness has bene applied the fabric is rolled upon the roller $h^3$ which is driven by the roller $h^2$ (Figures 1 and 3).

When two fabrics are to be stuck together they are passed into a doubling machine of known type and the fabrics may if necessary be treated with vapours of a rubber solvent and then calendered and vulcanised, if the deposited material is rubber latex.

Depositions of latex on the bottom of the spraying chamber P is prevented by the currents of air entering the chamber independently of the spraying device through $p$ as shown by the arrow I. The suspended globules of liquid are carried into the conduit C and are here met by currents of air entering through the openings $t$, as indicated by arrows 2, and in this way are projected against the fabric and deposited thereon.

By arranging that the conduit is inclined to the horizontal the particles carried along it have a tendency to deposit on the fabric by gravity, and this effect is accelerated by the openings $t$ and the baffles $t^1$.

An advantage of the present invention is that the liquid such as latex may be sprayed in a much finer mist than formerly and a more even distribution of liquid on the fabric is thus obtained.

Referring to Figure 5, any convenient number of spray-guns $r$, arranged in two or more rows are supplied with latex. The spray-guns project through the wall of the chamber P and project a spray of latex on to the fabric T, which is secured to an endless conveyor consisting of a pair of chains provided with pins as shown in Figure 4. These chains are supported on pinions carried by shafts 1, 2, 3, 4, 5, 6, 7, 8, 9, 8ª, 9ª, 8ᵇ ... 10, 11, 12, 13 and 14.

The fabric after passing before the spray-guns passes over the pulleys 2, 3, 4 and 5 to form a loop the interior of which forms a conduit or precipitation chamber for the particles of latex. This conduit consists of an inclined portion followed by a horizontal portion at the top of the apparatus. This arrangement makes it possible to provide a comparatively long conduit without unduly increasing the size of the apparatus. Behind the fabric fixed walls $i$, $i^1$, $i^2$, $i^3$ are provided defining the size of the conduit. Those particles of latex which are not deposited on the fabric at the time of spraying are retained in the conduit and are carried along the conduit by means of a current of air towards the opening 17 and conduit 18. The globules of latex are thus deposited on the fabric and the loss of latex is reduced to a minimum.

The conduit may consist of several successive loops of fabric and may consist, for example, of a series of inclined and horizontal portions in order to increase the total length of the conduit without unduly increasing the size of the apparatus.

On leaving the conduit the fabric passes over rollers 6 and 7 and enters the drier S where it follows a tortuous path and is subjected to a current of air forced into the drying chamber through a heater 19 by means of a fan V. The air is distributed by means of openings 20 along the bottom of the drier and after passing through the drier escapes by a conduit $v$.

In the method and apparatus above described the latex is applied to the fabric in a series of coatings as described in United States patent specification Serial Number 162,892. The arrangement of apparatus ensures that the losses of the sprayed material are reduced to a minimum.

It will be understood that the invention is applicable not only to the deposition of latex but also to the application of other liquids and that in certain cases the drier may be omitted.

We claim:

1. A method of coating the high points of a surface of a sheet of fabric with a liquid which comprises directing the liquid toward said surface of the fabric in finely divided form, moving the said surface after the application of liquid thereto in a direction intermediate the horizontal and vertical in an enclosed space in contact with a gaseous suspension formed of droplets of the liquid which have not been deposited on the said surface, and causing the said suspension to be carried along in the enclosed space with the sheet material.

2. Apparatus for coating a surface of a web of flexible material with a liquid in the form of a finely divided spray which comprises a spraying chamber, means therein for producing a fine spray of liquid an elongated enclosed space forming an extension of said spraying chamber disposed at least in part at an acute angle to the horizontal, means for carrying into said enclosed space the gaseous suspension of liquid particles not deposited on the fabric in the spraying chamber and a conveyor supporting the web of flexible material and carrying it through the spraying chamber and the extension thereof.

3. Apparatus for coating a surface of a web of fabric with rubber latex in the form of a finely divided spray which comprises a spraying chamber, means therein for producing a fine spray of liquid, a conduit forming an extension of said spraying chamber, means including adjustable openings in the wall of said conduit for maintaining a current of air in said conduit away from the spraying chamber, baffles for directing the air on to the surface of the fabric to which the latex has been applied, an endless conveyor to which the web of fabric is attached, and means for circulating said conveyor through the spraying chamber, and the extension thereof.

4. Apparatus for coating a surface of a web of fabric with rubber latex in the form of a finely divided spray which comprises a spraying chamber, means therein for producing a fine spray of liquid a conduit forming an extension of said spraying chamber, means for maintaining a current of air from the spraying chamber through the extension thereof, an endless conveyor to which the web of fabric is attached circulating through the spraying chamber and the extension thereof, and means for supporting and guiding said conveyor so as to form a loop in the extension of the spraying chamber, said loop constituting the major portion of the walls of said extension of the spraying chamber.

5. Apparatus for coating a surface of a web of fabric with a liquid in the form of a finely divided spray which comprises a spraying chamber, means therein for producing a fine spray of liquid, a conduit forming an extension of said spraying chamber and disposed at least in part at an acute angle to the horizontal, means for maintaining a current of air from the spraying chamber to the extension thereof, and means for supporting, guiding and advancing the web of fabric in such a way as to form a loop in said extension serving to provide a moving surface for a portion of the walls of said conduit.

6. Apparatus for coating a surface of a web of fabric with rubber latex in the form of a finely divided spray which comprises spraying means, means for so supporting, guiding and advancing the fabric as to form a conduit adjacent said spraying means and enclosing the discharge ends thereof, said conduit consisting of an inclined portion and a horizontal portion the major portion of two opposite longitudinal walls whereof are constituted by the fabric which has been sprayed, and a flue associated with said conduit for maintaining a current of air from the spraying means through the said conduit.

FERNAND FREDERIC SCHWARTZ.
MARC ALFRED CHAVANNES.